US006644457B2

(12) United States Patent
Lauch

(10) Patent No.: US 6,644,457 B2
(45) Date of Patent: Nov. 11, 2003

(54) ESCALATOR COMBTEETH FORCE DETECTOR

(75) Inventor: Richard Lauch, Hoptacong, NJ (US)

(73) Assignee: Inventio AG, Hergiswil NW (CH)

(*) Notice: Subject to any disclaimer, the term of this patent is extended or adjusted under 35 U.S.C. 154(b) by 0 days.

(21) Appl. No.: 10/043,955

(22) Filed: Jan. 10, 2002

(65) Prior Publication Data

US 2003/0127301 A1 Jul. 10, 2003

(51) Int. Cl.[7] .......... B65G 15/00
(52) U.S. Cl. .......... 198/322; 198/323; 198/325; 198/324
(58) Field of Search .......... 198/322, 323, 198/325, 324

(56) References Cited

U.S. PATENT DOCUMENTS

| | | | | |
|---|---|---|---|---|
| 3,580,376 A | * | 5/1971 | Loshbough | 198/16 |
| 4,126,218 A | * | 11/1978 | El Taher et al. | 198/325 |
| 5,255,771 A | * | 10/1993 | Nurnberg et al. | 198/323 |
| 5,307,918 A | * | 5/1994 | Rivera et al. | 198/323 |
| 5,381,687 A | * | 1/1995 | Nguyen et al. | 73/1 B |
| 5,601,178 A | * | 2/1997 | Zaharia et al. | 198/323 |
| 5,718,319 A | * | 2/1998 | Gih | 198/323 |
| 6,520,310 B1 | * | 2/2003 | Lauch et al. | 198/323 |

FOREIGN PATENT DOCUMENTS

| | | |
|---|---|---|
| GB | 1365548 | 10/1974 |

OTHER PUBLICATIONS

Patent Abstracts of Japan, Pub. No. 08073170A, Mar. 19 1996, Mitsubishi Denki, "Safety Device For Escalator".
Patent Abstracts of Japan, Pub. No. 08333075, Dec. 17, 1996, Mitsubishi Denki, "Safety Device Of Conveyer".

* cited by examiner

*Primary Examiner*—Joseph E. Valenza
*Assistant Examiner*—Rashmi Sharma
(74) *Attorney, Agent, or Firm*—Schweitzer Cornman Gross & Bondell LLP

(57) ABSTRACT

An escalator combtooth assembly for an escalator is responsive to combplate obstruction and generates an alarm signal when an obstruction is encountered. One or more combteeth plates are pivotally mounted to the front or leading edge at a combplate assembly. In response to an encountered obstruction one or more of the plates rotate upwardly. Electrical switch contacts associated with the combteeth plates change state when the plate rotates, allowing an alarm signal to be generated. The combteeth plates may include rearwardly-extending arms which pass through accepting slots located at the rear of a ledge on a main complete body upon which the combteeth plates rest. A guide device, such as a bolt, limits the degree of available rotation for the plates, which are biased in an initial position, preferably by an elastomeric member.

7 Claims, 3 Drawing Sheets

FIG. 3
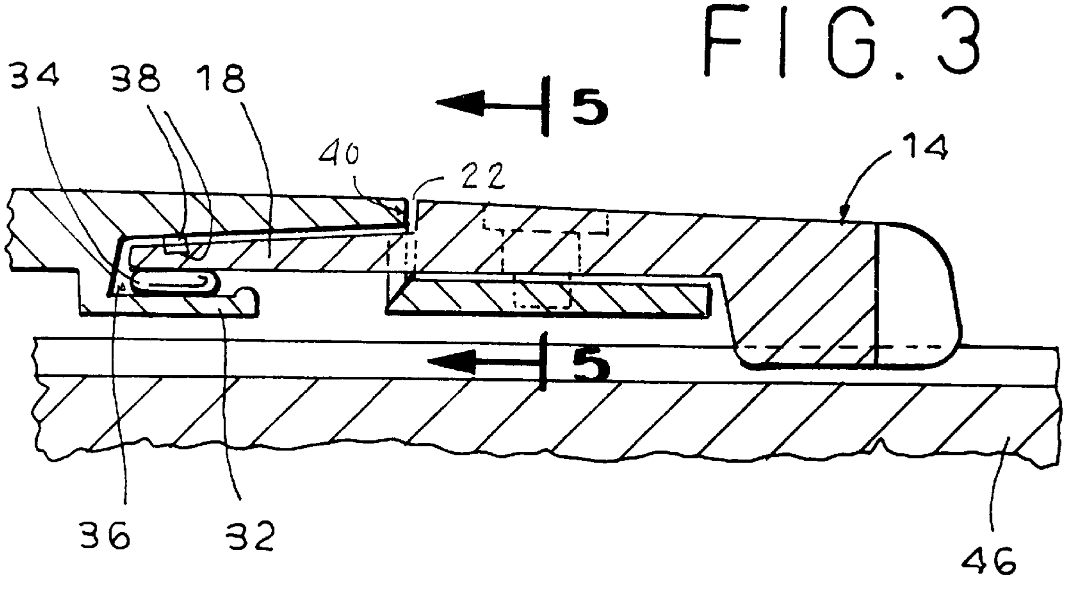
FIG. 4
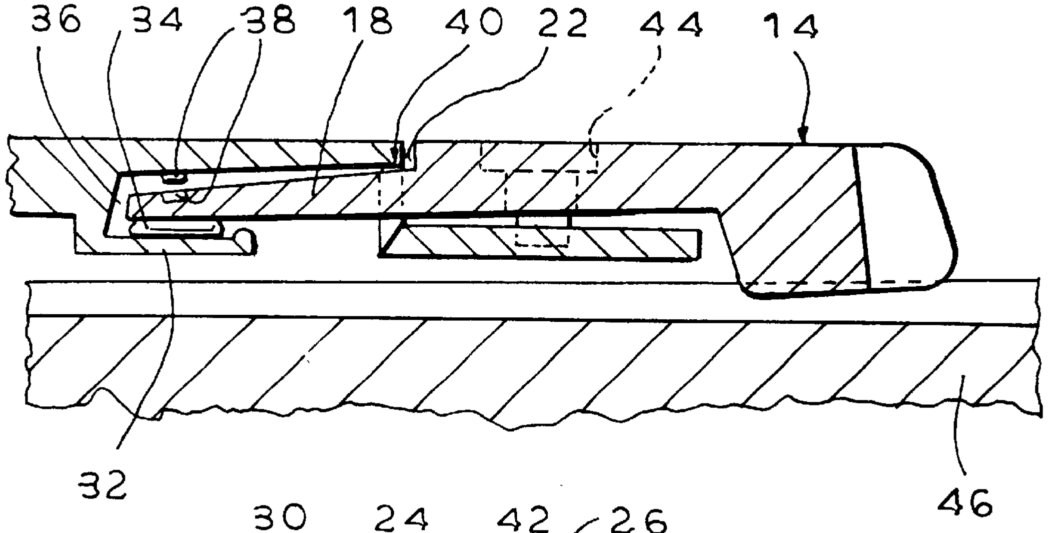
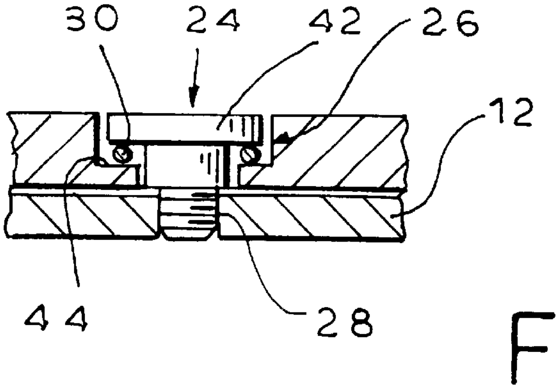
FIG. 5

ESCALATOR COMBTEETH FORCE DETECTOR

The present invention relates to a combtooth assembly for an escalator combplate which is responsive to combplate obstructions and which can generate an alarm signal in response to an obstruction.

BACKGROUND OF THE INVENTION

The riser and step tread surfaces of escalators are normally of a ribbed construction that provides, with respect to at least the tread in particular, a more secure contact surface for passengers. At the escalator landings the steps are engaged by, and pass under a combplate, which provides the landing platform on which the escalator's users embark onto, or disembark from, the moving steps. The forward edge of the combplate is provided with a complementary serrated construction which closely interfits with the ribbed construction of the moving steps to form a smooth transition area.

The point of passage of the moving steps under the combplate creates a potential location for entrapment between the step and combplate. Aware of this potential, operating codes and regulations typically require that in the event of an obstruction, which generates an upward force upon the combplate of an excess of a particular level, escalator operation is shut down.

Obstructions resulting in forces below the shut-off level can occur, however, and can also be deleterious, either to escalator operation or to a passenger. It is accordingly a purpose of the present invention to provide a combplate force detector apparatus that is capable of detecting and responding to relatively low intensity forces, permitting an alarm indication to be registered.

Another purpose of the present invention is to provide a combplate force detector apparatus that utilizes a pivoting combteeth plate that can be easily installed and replaced by field personnel.

Still another purpose of the present invention is to provide a combplate force detector apparatus that is adjustable over a range of activation forces.

Yet a further purpose of the present invention is to provide a combplate force detector apparatus utilizes a pivoting combteeth plate wherein the range of motion of the pivoting element is limited to prevent further interference with escalator operation and passenger use.

BRIEF DESCRIPTION OF THE INVENTION

In accordance with the foregoing and other objects and purposes, a combplate force detector in accordance with the present invention comprises a combplate construction having combteeth plates mounted to a main combplate assembly in a manner that allows them slight freedom to rotate upwardly in response to an obstruction. Rotation of a combtooth plate operates an electrical switch, by which the rotation and corresponding obstruction can be sensed. Stop means are provided to limit the degree of rotation of the combteeth plate to prevent the combteeth plate from rising above step level which would allow larger objects to become entrapped.

BRIEF DESCRIPTION OF THE DRAWINGS

A fuller understanding of the present invention will be made upon consideration of the following, detailed description of a preferred, but nonetheless illustrative embodiment of the invention, when reviewed in association with the annexed drawings, wherein:

FIG. 3 is a side sectional view of the forward portion of a combplate assembly incorporating the present invention;

FIG. 4 is a side sectional view of the forward portion of a combplate assembly incorporating the present invention depicting a combteeth plate in a raised position in response to an obstruction; and FIG. 5 is a detail sectional view taken along line 5—5 in FIG. 3 depicting the mounting of a combteeth plate to a main combplate assembly.

DETAILED DESCRIPTION OF THE INVENTION

Figure 1:
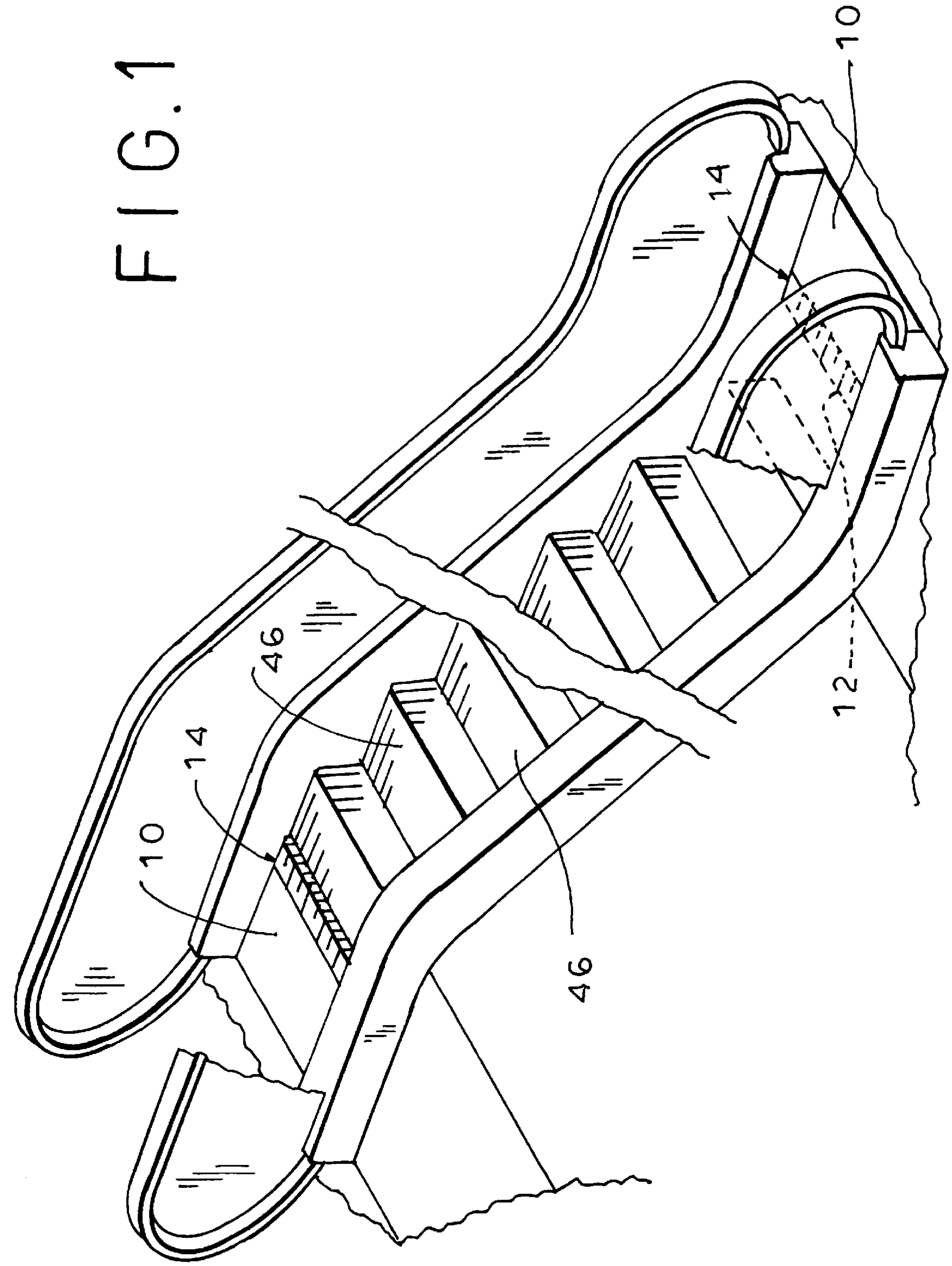
FIG. 1 is a perspective view of an escalator with the invention installed thereon.
Figure 2:
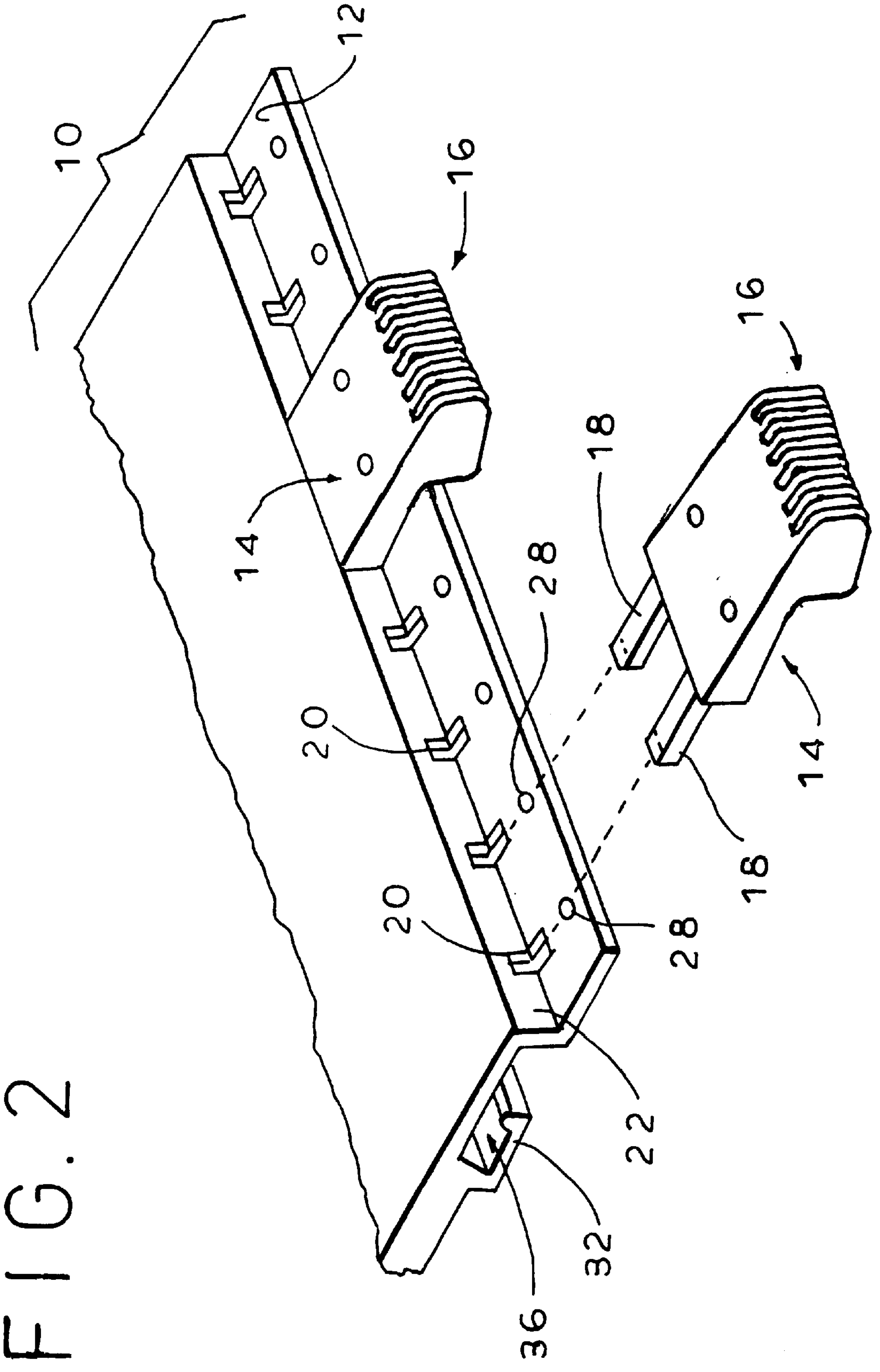
FIG. 2 is a perspective view of a portion of an escalator combplate assembly of the present invention illustrating both an installed combteeth plate as well as a combteeth plate displaced from the combplate.

With reference to the Figures, a combteeth force detector constructed in accordance with the present invention comprises a main combplate assembly 10 having a forwardly-extending ledge 12 to which are mounted one or more combteeth plates 14. Preferably a series of individually pivotal combteeth plates are utilized to facilitate the detection of localized obstructions which may arise at various locations across the width of the combplate assembly. Each of the combteeth plates 14 may be of a cast construction as known in the art, with an integral comb construction 16 at its forward edge constructed in a known manner to be compatible with the particular escalator step construction with which the combplate is to be used.

Each of the combteeth plates 14 is provided with one or more arms, such as a pair of arms 18, projecting rearwardly. Each of the arms is in turn accommodated by the main combplate assembly 10 through a slot 20 located at the intersection of the rearward edge of the ledge 12 and the adjacent vertically-extending wall 22 of the main combplate assembly, the upper surface of the combteeth plates being aligned with the upper surface of the main combplate assembly 10. As may be seen in FIGS. 3 and 4, the upper edges 40 of the slots 20 serve as fulcrums for the combteeth plates, the plates being capable of pivoting upward (counterclockwise in the Figures) generally about the intersection points between the arms 18 and the main body of the combteeth plate. The combteeth plates are preferably mounted upon the main combplate assembly with the rear faces of the combteeth plates, from which the arms 18 project, positioned slightly forward of the main combplate assembly wall 22, providing the necessary clearance to permit the upward rotation of the combteeth plate about the point 40 when an obstruction is encountered.

In order to retain the combteeth plates upon the main combplate assembly 10 and provide for an adjustable, limited range of pivoting motion, the combteeth plates 14 may be mounted to the main combplate assembly 10 by use of mounting bolts 24, which extend through into stepped mounting bores 26 in the combteeth plates and engage complementary threaded bores 28 in the combplate ledge 12. Preferably two bolts are used with each combteeth plate 14. As detailed in FIG. 5, a compressive element rests on the ledge 44 of the stepped bore 26 under the head 42 of the bolt 24, and is slightly compressed by the bolt, the biasing force generated by the compression acting to maintain the combteeth plate in the normal, unobstructed position shown in FIG. 4. The compressive element may be in the form of an elastomeric polymer o-ring 30 which encircles the shank of the bolt. When an obstruction is encountered between the escalator step 46 and the combteeth plate, the forward edge of the combteeth plate is driven upward, as shown in FIG. 4, further compressing the compressive element as the combteeth plate pivots about the point 40. The total amount of upward rotation and displacement of the combteeth plate permitted is controlled by the net clearance between the heads of the mounting bolts 24 and the ledges 44 of the stepped bores 26 as further limited by the compressibility of the o-rings 30. Typically, the maximum vertical displacement for the front of the combteeth plates is about one-eighth inch.

In addition to o-ring 30, a second compressive element, such as elastomeric pads 34, may be located between the distal ends of the arms 18 and a lower transverse lipped ledge 32 of the main combplate assembly 10, which is spaced from a lower surface of the main combplate assembly to form an a reception channel 36 for the distal ends of the arms. A single pad 34 may extend across the width of the combplate or individual pads may be associated with each arm or pair of arms for a given combteeth plate. The pad is chosen and sized to provide an upward bias against the arms and be normally in a slightly compressed state. The combination of the first and second compressive elements provides a total bias force retaining the combteeth plates in the unobstructed positions. The ledges 32 may also serve as a stop, in conjunction with the mounting bolt clearance, for rotation of the combteeth plates.

In order to sense the presence of an obstruction resulting in the pivoting of a combteeth plate, electrical switch contacts 38 are mounted between the main combplate assembly and each combteeth plate 14 to provide a state change when a combteeth plate encounters an obstruction and pivots upwardly. Preferably a switch contact is located on at least one of the arms of each combteeth plate, the other contact of the switch contact pair being located on an adjacent lower surface of the main combplate assembly. The switches, may be maintained in a normally closed state by the bias applied to the combteeth plate by the compressive elements. When an obstruction is encountered and the combteeth plates pivots upward, the bias force of the compressive elements is overcome. The switch contacts 38 separate, the change of electrical state thereof being used to indicate the presence of the obstruction. Leads (not shown) couple the switch contacts to remotely positioned circuitry as required. The amount of force required to pivot the combteeth plate and separate the contacts, which may be in the range of about 10 to 30 pounds, is controlled by the appropriate choice of the compressive elements.

Appropriate electrical processing circuits may be used to monitor and detect switch contact opening and generate an appropriate signal. Such circuitry can include signal processing such that momentary contact openings, resulting by, for example, combplate bounce, would not activate an alarm signal. In a presently preferred embodiment, a signal of an excess of one second may be required.

The construction of the present invention allows combplate entrapment to be monitored and corrective action taken at obstruction force levels greatly reduced from those normally required by step impact sensors. The present construction allows for incorporation of such a sensing structure integral with a combplate assembly, within the limited available space below a combplate, and further allows the replacement of the combteeth plates by a field mechanic when they are broken or damaged as a result of normal wear and tear.

I claim:

1. An escalator combplate force detection apparatus for detecting escalator step-combplate obstructions during normal escalator operation, comprising:

a main combplate body having a forward ledge and at least one reception slot for a combteeth plate arm;

at least one combteeth plate pivotally mounted to the main combplate body and having combteeth at a forward edge and at least one arm extending from a rear edge into the corresponding reception slot;

guide means mounted to at least one of the main combplate body and at least one combteeth plate for limiting the range of pivoting motion of the combteeth plate;

bias means for applying a bias force to the at least one combteeth plate to retain the at least one combteeth plate in an initial position; and electrical switch means associated with the at least one arm and corresponding reception slot to generate a signal indicating of the pivoting of the combteeth plate from the initial position as a result of contact of a combteeth plate with an obstruction during escalator operation.

2. The apparatus of claim 1, wherein the guide means comprise a mounting bolt.

3. The apparatus of claim 2, wherein the mounting bolt is mounted to the main combplate and extends through a bore in the associated combteeth plate.

4. The apparatus of claim 1 wherein the guide means comprise the at least one arm and reception slot.

5. The apparatus of claim 1 further including means for biasing the combteeth plate into the initial position.

6. The apparatus of claim 5 wherein the biasing means comprise a mounting bolt mounted to the main combplate and extending through a bore in the combteeth plate and an elastomeric element mounted between a head of the mounting bolt and the combteeth plate.

7. The apparatus of claim 5 wherein the biasing means comprise at least one arm extending from a rear edge of the combteeth plate, a reception slot for the arm in the main combplate has a reception slot for the arm.

* * * * *